UNITED STATES PATENT OFFICE.

JONAS F. GROSS, OF ALLENTOWN, PENNSYLVANIA.

ALUMINUM SOLDER.

1,145,307.  Specification of Letters Patent.  Patented July 6, 1915.

No Drawing.   Application filed January 15, 1915.   Serial No. 2,475.

*To all whom it may concern:*

Be it known that I, JONAS F. GROSS, a citizen of the United States, residing at Allentown, in the county of Lehigh and State of Pennsylvania, have invented new and useful Improvements in Aluminum Solder, of which the following is a specification.

My invention relates to a novel and improved solder composition for use in soldering pieces or parts of aluminum together, the object of the invention being to provide a soldering composition which is comparatively inexpensive, and by means of which aluminum parts may be quickly and solidly soldered together by the use of an ordinary soldering iron, and without the necessity of employing a blow-torch or a very high degree of heat.

In carrying my invention into practice, I provide a soldering composition consisting of the following elements, to wit: block tin, 80 parts; lead, 16 parts; aluminum, 8 parts; zinc, 16 parts; and phosphorus tin, 8 parts. These elements are fused or melted together in the usual manner and molded into bar or other desired shape, or the elements may be united with the parts to be joined at the time of making the union.

In the use of the solder; the aluminum parts to be united are properly cleansed and a soldering iron heated to ordinary soldering temper employed to fuse the solder and properly spread the same at the joint. This solder will firmly unite the particles, without the use of a blow-torch or high degree of heat, and also without the use of any auxiliary agent to prevent oxidation of the surfaces to be joined. My improved composition prevents the formation of any film of oxid and therefore enables the metals to be easily and conveniently soldered together.

While I have specified the use of the solder for joining pieces of aluminum, it may also be used for joining aluminum to other metals, and such use is held to fall clearly within the spirit and scope of my invention.

Instead of employing zinc in the proportion of 16 parts, I may employ, as an equivalent, zinc in the proportion of 10 parts to 6 parts of a hard soldering composition, made up of zinc and tin, or the equivalent thereof.

I claim:—

A soldering composition for aluminum consisting of the following elements in substantially the proportions named, to wit, block tin, 80 parts; lead, 16 parts; aluminum, 8 parts; zinc, 16 parts; and phosphorus, 8 parts.

In testimony whereof I affix my signature in presence of two witnesses.

JONAS F. GROSS.

Witnesses:
LEWIS K. SCHALTER,
WILLIAM H. GROSS.